(12) United States Patent
Yasumura

(10) Patent No.: US 6,341,075 B2
(45) Date of Patent: Jan. 22, 2002

(54) HIGH VOLTAGE STABILIZING CIRCUIT

(75) Inventor: Masayuki Yasumura, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/773,801

(22) Filed: Feb. 1, 2001

(30) Foreign Application Priority Data

Feb. 3, 2000 (JP) ....................................... 2000-032664

(51) Int. Cl.$^7$ .............................................. H02M 3/335
(52) U.S. Cl. ...................... 363/21.2; 363/21.15; 363/97
(58) Field of Search ........................... 363/21.01, 21.02, 363/21.04, 21.12, 21.15, 21.18, 95, 97, 131

(56) References Cited

U.S. PATENT DOCUMENTS

| | | | | |
|---|---|---|---|---|
| 3,742,371 A | * | 6/1973 | Seibt et al. ..................... | 363/18 |
| 5,451,750 A | * | 9/1995 | An ............................... | 363/97 |
| 5,973,937 A | * | 10/1999 | Yasumura ..................... | 363/19 |
| 5,973,946 A | * | 10/1999 | Yasumura ..................... | 363/89 |
| 5,991,171 A | * | 11/1999 | Cheng ......................... | 363/21.03 |

* cited by examiner

Primary Examiner—Adolf Deneke Berhane
(74) Attorney, Agent, or Firm—Frommer Lawrence & Haug LLP; William S. Frommer

(57) ABSTRACT

A high voltage stabilizing circuit according to the present invention has a voltage resonance type converter as a switching converter that performs switching operation using direct-current input voltage obtained from commercial alternating-current power, and switching output of the voltage resonance type converter is directly transmitted to a primary winding of a flyback transformer FBT (high voltage output transformer). Then, a rectifier circuit for high voltage connected on the secondary side of the flyback transformer FBT provides high direct-current voltage as an anode voltage for a CRT, for example. The high direct-current voltage is stabilized by controlling the switching frequency of the voltage resonance type converter on the primary side according to the level of the high direct-current voltage. This configuration requires only one switching converter to be provided on the primary side of the flyback transformer FBT.

3 Claims, 9 Drawing Sheets

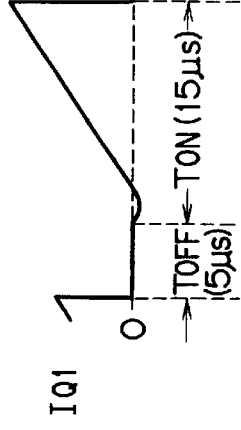
FIG. 2A
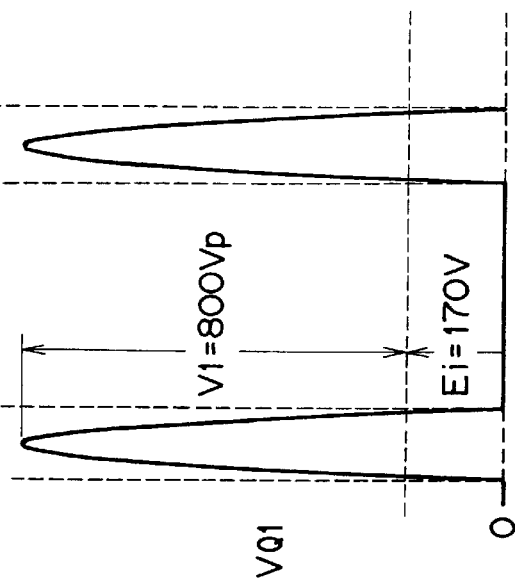
FIG. 2C
FIG. 2D
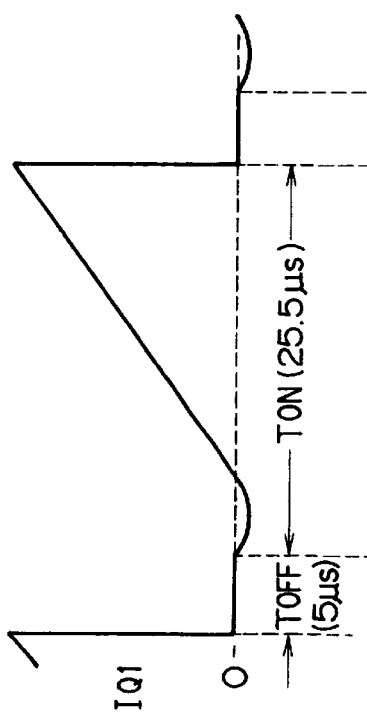
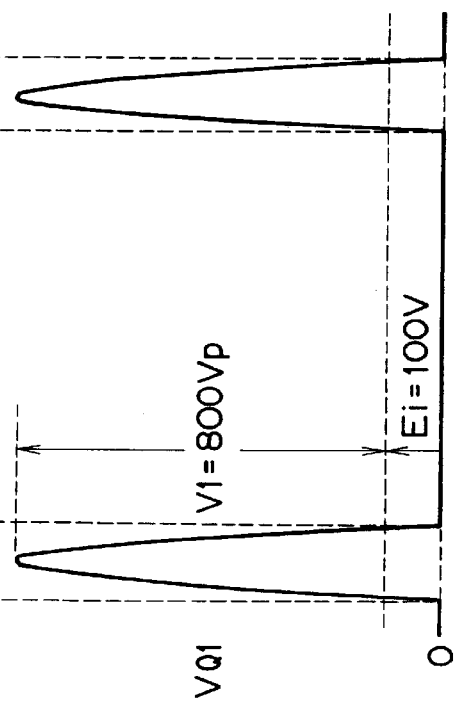

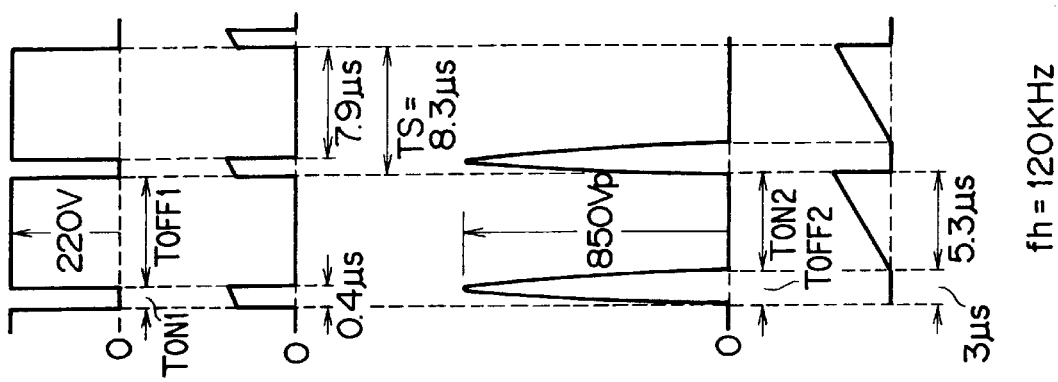
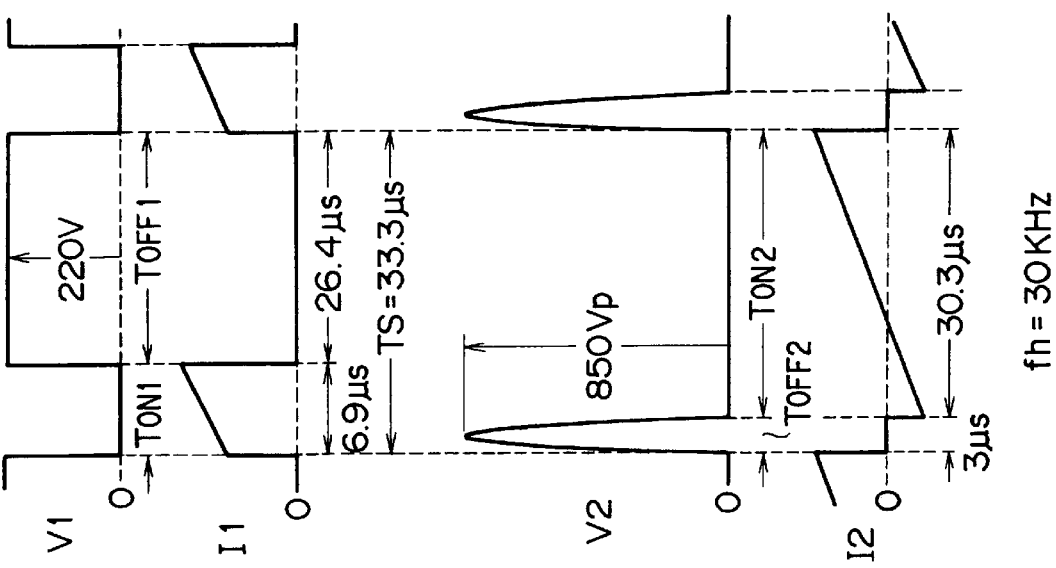

CRT SCREEN

HIGH VOLTAGE STABILIZING CIRCUIT

BACKGROUND OF THE INVENTION

The present invention relates to a high voltage stabilizing circuit which generates stabilized high voltage from commercial alternating-current power to provide anode voltage to be applied to an anode electrode of a cathode-ray tube, for example.

Television receivers, projectors, and display units for personal computers which employ cathode-ray tubes (hereinafter referred to as CRTs) as display devices have widely spread.

As is well known in the art, in various display units having such CRTs, a required level of high voltage (anode voltage) needs to be supplied in a stable manner to anode electrodes of the CRTs.

Specifically, although the level of anode voltage is generally set at about 25 KV to 35 KV, the anode voltage is varied according to variations in alternating-current input voltage and a load, for example. Variations in the anode voltage may in turn vary screen sizes in a vertical and a horizontal direction of an image displayed on the CRT. In addition, variations in the anode voltage cause a bright white peak image to be distorted when displayed on the screen. As shown in FIG. 9 for example, when an original rectangular white peak image as indicated by a solid line is displayed, the white peak image is distorted into a trapezoidal shape as indicated by a broken line.

Therefore, in practice, a so-called high voltage stabilizing circuit is provided as an anode voltage supplying circuit to stabilize anode voltage for output.

FIG. 6 is a circuit diagram showing an example of a high voltage stabilizing circuit. The high voltage stabilizing circuit shown in the figure is to be provided for a so-called multiscanning-capable display unit for a personal computer.

First, FIG. 6 shows a rectifying and smoothing circuit comprising a bridge rectifier circuit Di and a smoothing capacitor Ci. The rectifying and smoothing circuit rectifies and smoothes commercial alternating-current power AC to provide a rectified and smoothed voltage Ei whose level is equal to that of the commercial alternating-current power AC. The rectified and smoothed voltage Ei is supplied as direct-current input voltage to a switching power supply circuit 10.

The switching power supply circuit 10 is a DC-to-DC converter configured to provide a direct-current output voltage Eo by switching and stabilizing the inputted rectified and smoothed voltage Ei. In this case, the switching power supply circuit 10 outputs a direct-current output voltage Eo stabilized at 240 V.

The direct-current output voltage Eo is inputted to a step-down converter 20.

The step-down converter 20 is for example formed by connecting a drain and a source of a MOS-FET switching device Q11 in series with a choke coil CH1 between a line of the direct-current output voltage Eo and a positive electrode of a smoothing capacitor COA and inserting a diode DD1 between a point where the source of the switching device Q11 and the choke coil CH1 are connected and a primary-side ground.

The switching device Q11 is externally driven by a driving voltage from a driving circuit 14, which will be described later, to perform switching on the direct-current output voltage Eo. A current that flows according to switching operation by the switching device Q11 is stored in the smoothing capacitor COA via the choke coil CH1 and the diode DD1. Then, the step-down converter 20 outputs a stepped-down direct-current voltage EOA, which is a voltage across the smoothing capacitor COA.

The stepped-down direct-current voltage EOA is supplied to a voltage resonance type converter 30.

The voltage resonance type converter 30 shown in FIG. 6 is provided with a MOS-FET switching device Q12 to perform externally excited single-ended operation.

In the voltage resonance type converter 30, a drain of the switching device Q12 is connected to a positive terminal of the stepped-down direct-current voltage EOA via a choke coil CH2, while a source of the switching device Q12 is connected to the primary-side ground. A gate of the switching device Q12 is supplied with a driving voltage outputted from a driving circuit 16, which will be described later. The switching device Q12 is driven for switching operation by this driving voltage.

The drain of the switching device Q12 is also connected to a starting point of a primary winding N1 of a flyback transformer FBT, which will be described later. In this case, an ending point of the primary winding N1 is grounded to the primary-side ground via a direct current blocking capacitor C11.

Thus, switching output of the switching device Q12 is transmitted to the primary winding N1 of the flyback transformer FBT, whereby an alternating voltage in accordance with the switching frequency is obtained at the primary winding N1.

A parallel resonant capacitor Cr is connected in parallel with the drain and source of the switching device Q12. Capacitance of the parallel resonant capacitor Cr, inductance L12 of the choke coil CH2, and leakage inductance L1 of the primary winding N1 side of the flyback transformer FBT form a primary-side parallel resonant circuit of the voltage resonance type converter. Although detailed description is omitted here, voltage V2 across the resonant capacitor Cr actually forms a sinusoidal pulse waveform during an off period of the switching device Q12 as a result of the action of the parallel resonant circuit, so that voltage resonance type operation is obtained.

Also, a clamp diode DD2 is connected in parallel with the drain and source of the switching device Q12. The clamp diode DD2 forms a path of clamp current that flows during the off period of the switching device Q12.

The switching devices Q11 and Q12 on the primary side are driven for switching operation by the following configuration.

On the basis of a horizontal synchronizing signal frequency fH corresponding to a currently set resolution, a synchronizing circuit 11 generates and outputs a horizontal synchronizing signal having the frequency fH. Since the high voltage stabilizing circuit in this case is to be provided for a multiscanning display unit, the horizontal synchronizing signal frequency fH is varied within a range of 30 KHz to 120 KHz, for example.

In this case, the horizontal synchronizing signal generated by the synchronizing circuit 11 is inputted to an oscillating circuit 12. The oscillating circuit 12 converts the horizontal synchronizing signal into an oscillating frequency signal to be used for driving the switching devices Q11 and Q12, and outputs the converted signal to a PWM control circuit 13 and a driving circuit 16.

The driving circuit 16 generates a driving voltage for driving the switching device Q12 from the inputted oscillating frequency signal, and outputs the driving voltage to the gate of the switching device Q12. Thus, the switching frequency of the switching device Q12 coincides with the currently set horizontal synchronizing signal frequency fH.

The PWM control circuit 13 effects PWM control of the inputted oscillating frequency signal on the basis of a detection output from an error amplifier circuit 15. Specifically, the PWM control circuit 13 variably controls a duty ratio of an on/off period in one cycle of the oscillating frequency signal, and outputs the result to a driving circuit 14. The driving circuit 14 generates driving voltage using a PWMed oscillating frequency signal outputted from the PWM control circuit 13, and outputs the signal to the switching device Q11. Thus, the switching frequency of the switching device Q11 also coincides with the currently set horizontal synchronizing signal frequency fH. This means that both the switching device Q11 and the switching device Q12 are allowed to perform switching operation at a switching frequency in synchronism with the horizontal synchronizing signal frequency fH. It should be noted that a duty ratio of an on/off period in one switching cycle of the switching device Q12 is governed by the waveform (duty ratio in one cycle) of the oscillating frequency signal changed by the PWM control circuit 13. This is related to stabilization of the level of high direct-current voltage EHV, that is, control for constant voltage, which will be described later.

The switching output obtained at the switching device Q12 of the voltage resonance type converter 30 described above is supplied to a high voltage generating circuit 40.

The high voltage generating circuit 40 comprises the flyback transformer FBT and a high voltage rectifier circuit provided on a secondary side thereof. The switching output of the switching device Q12 is transmitted to the primary winding N1 of the flyback transformer FBT.

As shown in FIG. 6, the primary winding N1 is wound on the primary side of the flyback transformer FBT. Also, five step-up windings NHV1, NHV2, NHV3, NHV4, and NHV5 are wound as secondary windings on the secondary side of the flyback transformer FBT. In practice, each of these step-up windings NHV1 to NHV5 is wound around a core in a divided and independent state. The step-up windings NHV1 to NHV5 are wound in such a manner that their polarity is opposite to that of the primary winding N1, whereby flyback operation is obtained.

As shown in FIG. 6, the step-up windings NHV1, NHV2, NHV3, NHV4, and NHV5 are connected in series with high voltage rectifier diodes DHV1, DHV2, DHV3, DHV4, and DHV5, respectively, thereby forming a total of five half-wave rectifier circuits. The five half-wave rectifier circuits are connected in series with each other. Then, a smoothing capacitor COHV is connected in parallel with the five serially connected half-wave rectifier circuits.

Thus, on the secondary side of the flyback transformer FBT, the five half-wave rectifier circuits rectify voltages induced in the step-up windings NHV1 to NHV5 to store the rectified voltages in the smoothing capacitor COHV. Accordingly, the level of direct-current voltage across the smoothing capacitor COHV is five times as high as the voltage induced in each of the step-up windings NHV1 to NHV5. The direct-current voltage across the smoothing capacitor COHV is converted into high direct-current voltage EHV to be used as anode voltage for a CRT, for example.

Operation for constant voltage by the circuit shown in FIG. 6 will next be described.

A series connection circuit of a voltage dividing resistance R1–R2 is connected in parallel with the smoothing capacitor COHV at both terminals thereof provided on the secondary side of the flyback transformer FBT. Hence, a point of connection between the voltage dividing resistances R1 and R2 has a voltage level obtained by dividing high direct-current voltage EHV by their voltage dividing ratio. The point of connection between the voltage dividing resistances R1 and R2 is connected to an input of the error amplifier 15. The error amplifier 15 compares the level of the divided high direct-current voltage EHV with a predetermined reference level to detect an error. Specifically, the error amplifier circuit 15 detects an error of the high direct-current voltage EHV level with respect to the predetermined reference level. Then, the error amplifier circuit 15 outputs a direct current or a direct-current voltage whose level is changed according to the amount of the error, for example.

The detection output of the error amplifier 15 is supplied to the PWM control circuit 13. The PWM control circuit 13 effects PWM control of the inputted oscillating frequency signal on the basis of the detection output from the error amplifier 15, and outputs the result to the driving circuit 14.

Thus, the switching device Q11 driven by the driving circuit 14 is fixed at the switching frequency in synchronism with the horizontal synchronizing signal frequency, and performs switching operation in accordance with the on/off-period duty ratio that is changed by the PWM control according to variations in the level of the high direct-current voltage EHV.

The level of stepped-down direct-current voltage EOA is determined by the level of the direct-current output voltage Eo, the switching frequency of the switching device Q11, and the duty ratio of an on/off period in one switching cycle of the switching device Q11. The stepped-down direct-current voltage EOA is expressed as:

$$EOA = Eo \cdot TON1/Ts$$

where one cycle of switching operation by the switching device Q11 is Ts and an on period in one cycle is TON1.

When the duty ratio of an on/off period in one switching cycle of the switching device Q11 is changed by the PWM control according to an error of the high direct-current voltage EHV level, as described above, the level of the stepped-down direct-current voltage EOA can be variably controlled.

FIGS. 7A to 7H show operating waveforms of the switching devices Q11 and Q12 in the circuit shown in FIG. 6. FIGS. 7A to 7D show operations at a horizontal synchronizing signal frequency fH=30 KHz, while FIGS. 7E to 7H show operations at the same points as in FIGS. 7A to 7D respectively at a horizontal synchronizing signal frequency fH=120 KHz.

FIGS. 7A and 7E show drain-to-source voltage V1 of the switching device Q11, and FIGS. 7B and 7F show switching current I1 that flows through the drain of the switching device Q11.

FIGS. 7C and 7G show voltage V2 across the parallel resonant capacitor Cr (parallel resonance voltage) connected in parallel with the switching device Q12, and FIGS. 7D and 7H show switching current I2 that flows through the drain of the switching device Q11.

FIGS. 7A and 7B show operations under PWM control at a horizontal synchronizing signal frequency fH=30 KHz where one switching cycle Ts of the switching device Q11 is 3.3 µs, and the period TON1 during which the switching device Q11 is turned on is 6.9 µs. In this case, the level of the stepped-down direct-current voltage EOA is about 50 V.

FIGS. 7E and 7F show operations under PWM control at a horizontal synchronizing signal frequency fH=120 KHz where one switching cycle Ts of the switching device Q11 is 8.3 μs, and the period TON1 during which the switching device Q11 is turned on is 0.4 μs. In this case, the level of the stepped-down direct-current voltage EOA is about 220 V.

As indicated by operations of the switching device Q12 shown in FIGS. 7C and 7D and FIGS. 7G and 7H, in the voltage resonance type converter 30 powered for operation by the stepped-down direct-current voltage EOA, a period TOFF2 during which the switching device Q12 is turned off is set to be constant at 3 μs irrespective of change in the horizontal synchronizing signal frequency fH. The period TOFF2 can be set to be constant by selecting the capacitance of the parallel resonant capacitor Cr.

When effecting PWM control of switching operation by the switching device Q11 according to variation in the level of the high direct-current voltage EHV and setting the off period TOFF2 of the switching device Q12 to be constant at 3 μs as described above, it is possible to control the parallel resonance voltage V2 to a constant level irrespective of changes in the horizontal synchronizing signal frequency fH, as indicated in FIG. 7C.

The parallel resonance voltage V2 is transmitted as switching output to the primary winding N1 of the flyback transformer FBT. Therefore, when the parallel resonance voltage V2 is controlled to a constant level, an alternating voltage obtained at the primary winding N1 of the flyback transformer FBT is also maintained at a constant level. Accordingly, the high direct-current voltage EHV generated on the secondary side of the flyback transformer FBT is also controlled to a constant level.

The high voltage stabilizing circuit shown in FIG. 6 thus stabilizes the level of the high direct-current voltage EHV.

As a summary of the operations described above, characteristics of variations of the high direct-current voltage EHV, the direct-current output voltage Eo, and the stepped-down direct-current voltage EOA with respect to the horizontal synchronizing signal frequency fH will be shown in FIG. 8.

According to the figure, the direct-current output voltage Eo is stabilized at 240 V by stabilizing operation of the switching power supply circuit 10.

The stepped-down direct-current voltage EOA is controlled so as to change linearly in a range of about 50 V to 220 V for horizontal synchronizing signal frequencies fH=30 KHz to 120 KHz. In FIG. 8, stepped-down direct-current voltages EOA when a load current IHV supplied by the high direct-current voltage EHV to a load is 1 mA and 0 mA are shown. Although the stepped-down direct-current voltage EOA at a load current IHV=1 mA is somewhat lower than the stepped-down direct-current voltage EOA at a load current IHV=0 mA, substantially the same voltage value is obtained.

Thus, by controlling the level of the stepped-down direct-current voltage EOA as described above and by setting the parallel resonance voltage V2 generated by the switching operation of the switching device Q12 to be constant irrespective of change (switching) of the horizontal synchronizing signal frequency fH as described above, the high direct-current voltage EHV becomes constant at about 27 KV, for example.

The high voltage stabilizing circuit shown in FIG. 6 thus stabilizes the high direct-current voltage EHV to suppress variations in screen sizes in a vertical and a horizontal direction of an image displayed on the CRT.

In the case of the high voltage stabilizing circuit configured as shown in FIG. 6, the trapezoidal distortion of the bright rectangular white image, which is caused by a variation ΔEHV in the high direct-current voltage EHV due to an increase in high voltage load current IHV occurring at the white peak, is dealt with by increasing the capacitances of the smoothing capacitors CO, COA, and COHV to a required level.

However, the high voltage stabilizing circuit configured as shown in FIG. 6 has the following problems.

First, the high voltage stabilizing circuit configured as shown in FIG. 6 performs power conversion in two stages by means of the step-down converter 20 and the voltage resonance type converter 30 in the process from the input of commercial alternating-current power to the generation of the high direct-current voltage EHV. Thus, overall power conversion efficiency in the high voltage stabilizing circuit as a whole is low; for example, the power conversion efficiency at a high voltage load power PHV=27 W (=high direct-current voltage EHV×IHV) is actually no more than 72%, and reactive power in this case is about 10.5 W. Then input power becomes correspondingly greater.

Moreover, with such a configuration, the actually assembled circuit also has a complex structure, thus resulting in increase in the number of parts.

Specifically, for example, the circuit requires two ferrite transformers (an FBT and an insulating converter transformer in the switching power supply circuit 10), two ferrite choke coils (CH1 and CH2), and at least three switching devices (Q11, Q12, and a switching device in the switching power supply circuit 10). Therefore, the size of the circuit itself becomes large as a result of large mounting area of its printed board, for example, and also the cost of the circuit becomes correspondingly high. In addition, the size and cost of parts in the circuit are increased because the capacitances of the smoothing capacitors CO, COA, and COHV are increased to suppress the trapezoidal distortion of the bright rectangular white image, as described above.

SUMMARY OF THE INVENTION

In view of the problems described above, an object of the present invention is to provide a high voltage stabilizing circuit which improves power conversion efficiency and reduces the size and cost thereof.

To achieve the above object, according to an aspect of the present invention, there is provided a high voltage stabilizing circuit including rectifying and smoothing means for rectifying and smoothing commercial alternating-current power and thereby providing direct-current input voltage; switching means having a switching device for interrupting the direct-current input voltage for output; a parallel resonant circuit on a primary side formed so as to convert operation of the switching means into voltage resonance type operation; a high voltage output transformer having a primary-side winding to which switching output of the switching means is transmitted and a secondary-side winding closely coupled to the primary winding for inducing a required high level of stepped-up alternating voltage; high direct-current voltage generating means supplied with the stepped-up alternating voltage for generating and outputting a required high level of direct-current voltage; and constant voltage control means for controlling the high direct-current voltage to a constant voltage by changing switching frequency of the switching device according to level of the high direct-current voltage.

As described above, the high voltage stabilizing circuit according to the present invention directly transmits switching output of a voltage resonance type converter provided on the primary side to the primary side of the high voltage output transformer, or for example a flyback transformer. A high direct-current voltage is obtained on the secondary side of the high voltage output transformer by using the stepped-up alternating voltage induced by the switching output on the primary side. Also, the high direct-current voltage is stabilized actively by variably controlling the switching frequency of the primary-side voltage resonance type converter according to the level of the high direct-current voltage.

Such a configuration requires only one voltage resonance type converter to serve as a switching converter for power conversion of direct-current input voltage obtained on the primary side from commercial alternating-current power.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIGS. 2A to 2D are waveform diagrams showing operation of main parts in the high voltage stabilizing circuit of the above embodiment;

FIGS. 7A to 7H are waveform diagrams showing operation of main parts in the high voltage stabilizing circuit of FIG. 6;

PREFERRED EMBODIMENTS OF THE INVENTION

Figure 1:
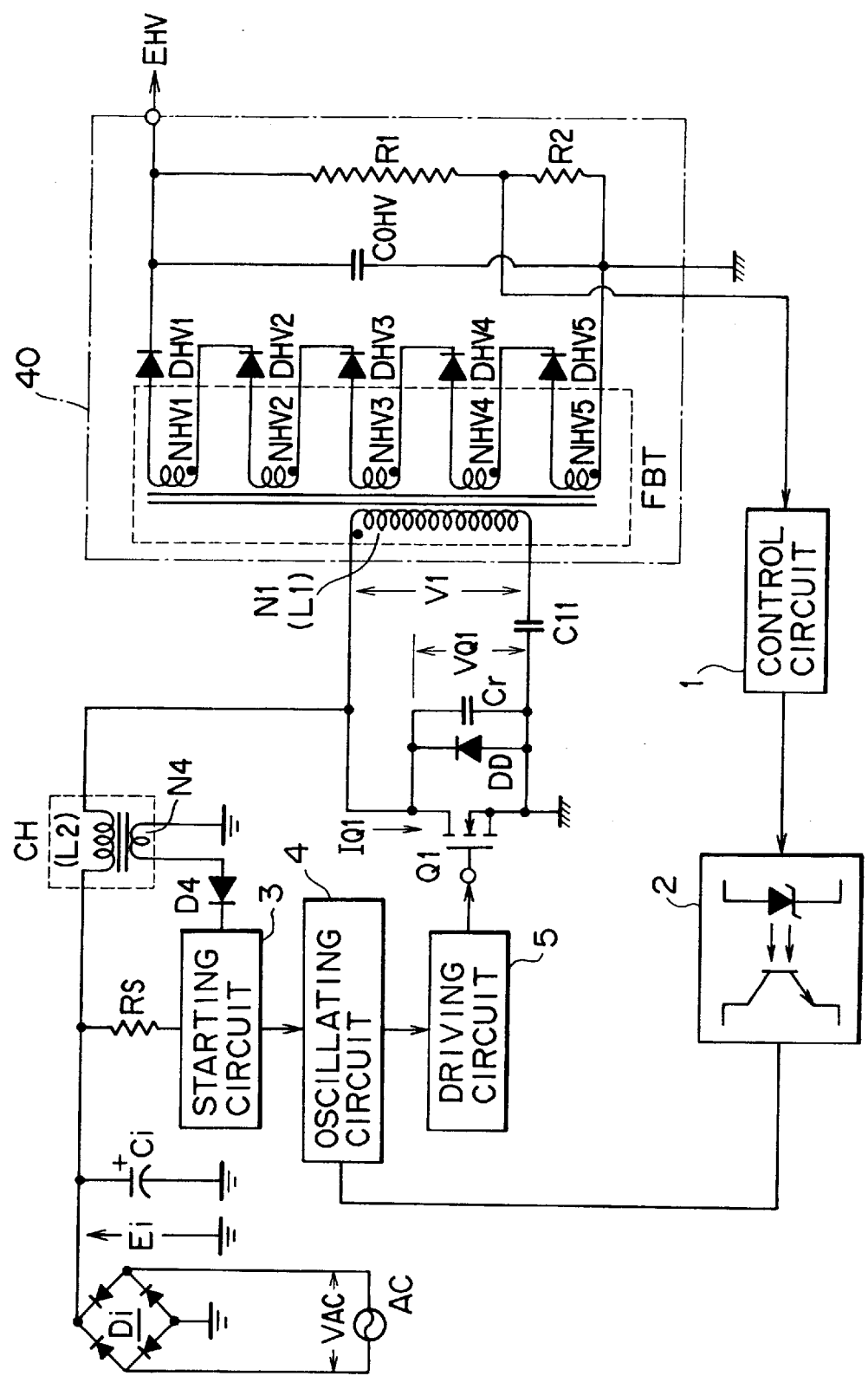
FIG. 1 is a circuit configuration diagram of a high voltage stabilizing circuit according to an embodiment of the present invention.
Figure 6:
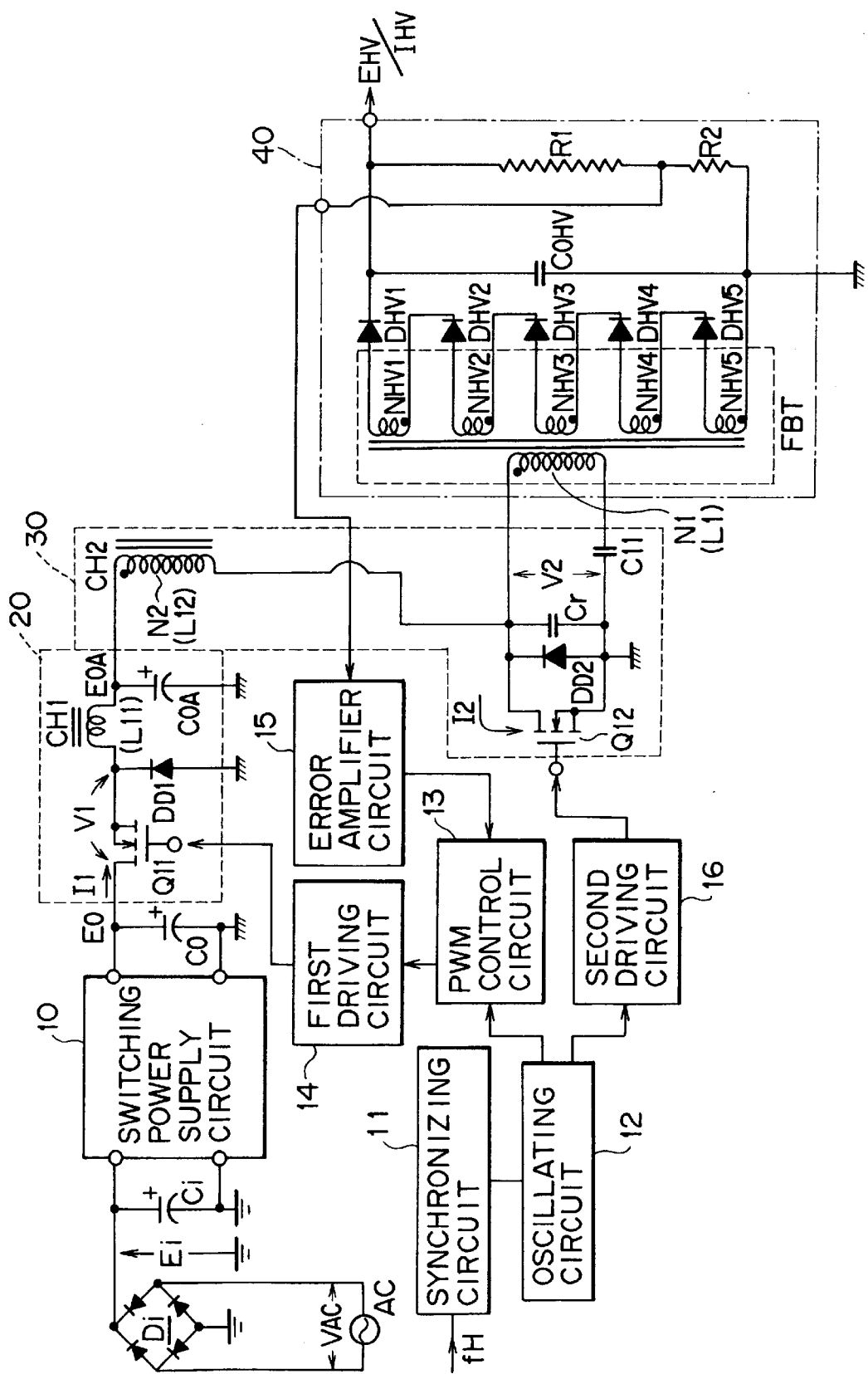
FIG. 6 is a circuit configuration diagram of a conventional high voltage stabilizing circuit.
Figure 8:
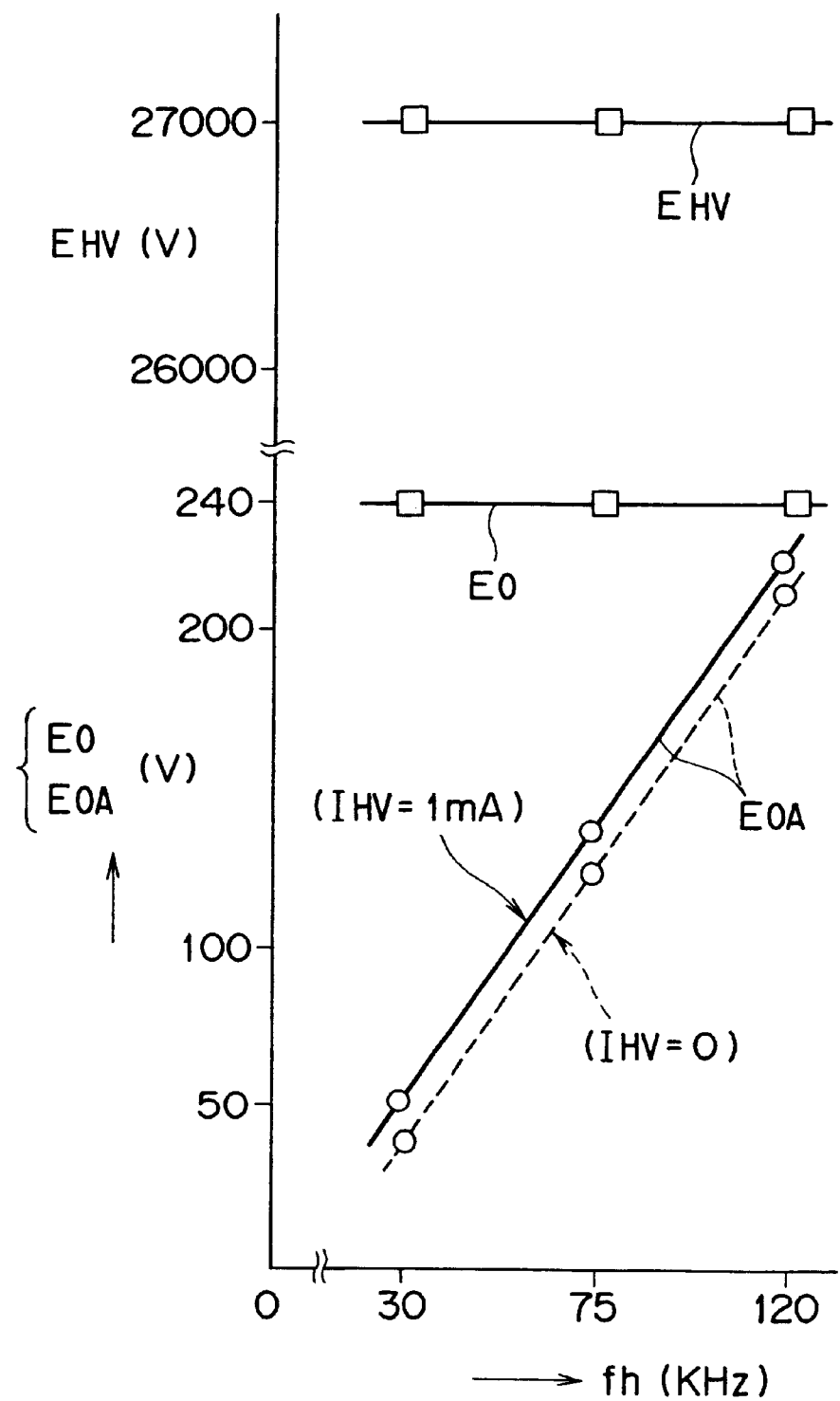
FIG. 8 is a diagram of assistance in explaining levels of high direct-current voltage and secondary-side direct-current output voltage with respect to horizontal synchronizing signal frequency in the high voltage stabilizing circuit of FIG. 6.

FIG. 1 is a circuit configuration diagram of a high voltage stabilizing circuit according to an embodiment of the present invention. In the figure, the same parts as in FIG. 6 are identified by the same reference numerals, and their description will be omitted.

A voltage resonance type converter that includes a switching device Q1 and performs switching operation by a so-called single-ended system is provided on a primary side of the circuit shown in FIG. 1. The voltage resonance type converter serves as a switching converter that interrupts direct-current input voltage obtained by rectifying and smoothing commercial alternating-current power (rectified and smoothed voltage Ei).

The voltage resonance type converter in this case is externally excited, and a MOS-FET, for example, is used as the switching device Q1. A drain of the switching device Q1 is connected to a positive electrode of a smoothing capacitor Ci via a choke coil CH, while a source of the switching device Q1 is connected to a primary-side ground.

A parallel resonant capacitor Cr is connected in parallel with the drain and source of the switching device Q1. Also, a clamp diode (body diode) DD is connected in parallel with the drain and source of the switching device Q1.

In this case, capacitance of the parallel resonant capacitor Cr and inductance L2 of the choke coil CH form a parallel resonant circuit. The parallel resonant circuit is set to resonate in response to switching operation by the switching device Q1. Thus, the switching operation by the switching device Q1 is of a voltage resonance type.

The switching device Q1 is driven for switching operation by an oscillating circuit 4 and a driving circuit 5.

The oscillating circuit 4 is oscillated to generate and output an oscillating signal. The driving circuit 5 converts the oscillating signal into a driving voltage, and outputs the driving voltage to a gate of the switching device Q1. Thus, the switching device Q1 is allowed to perform switching operation according to the oscillating signal generated by the oscillating circuit 4. Therefore, the switching frequency of the switching device Q1 and a duty ratio of an on/off period in one switching cycle depend on the oscillating signal generated by the oscillating circuit 4.

The oscillating circuit 4 changes the oscillation frequency of the oscillating signal to be outputted according to an error detection output supplied from a control circuit 1 via a photocoupler 2. This means that the switching frequency of the switching device Q1 is variably controlled, whereby direct-current high voltage (anode voltage) obtained on a secondary side of a flyback transformer FBT can be stabilized, as will be described later.

In this case, a starting circuit 3 is supplied with the rectified and smoothed voltage Ei via a starting resistance Rs, and also supplied with a low direct-current voltage obtained in a half-wave rectifier circuit comprising a winding N4 provided around the choke coil CH and a diode D4. The starting circuit 3 is intended to start the oscillating circuit 4 in response to these input voltages supplied at the start of power supply, for example.

As shown in FIG. 1, the present embodiment has a series connection circuit [N1–C11] in which a primary winding N1 of the flyback transformer FBT and a direct current blocking capacitor C11 are connected in series with each other. The series connection circuit [N1–C11] is connected in parallel with the switching device Q1. In this case, the drain of the switching device Q1 is connected to a starting point of the primary winding N1, while the source of the switching device Q1 is connected to an ending point of the primary winding N1 via the direct current blocking capacitor C11.

Thus, in the present embodiment, switching output of the switching device Q1 in the primary-side voltage resonance type converter is directly transmitted to the primary winding N1 of the flyback transformer FBT.

Figure 4:
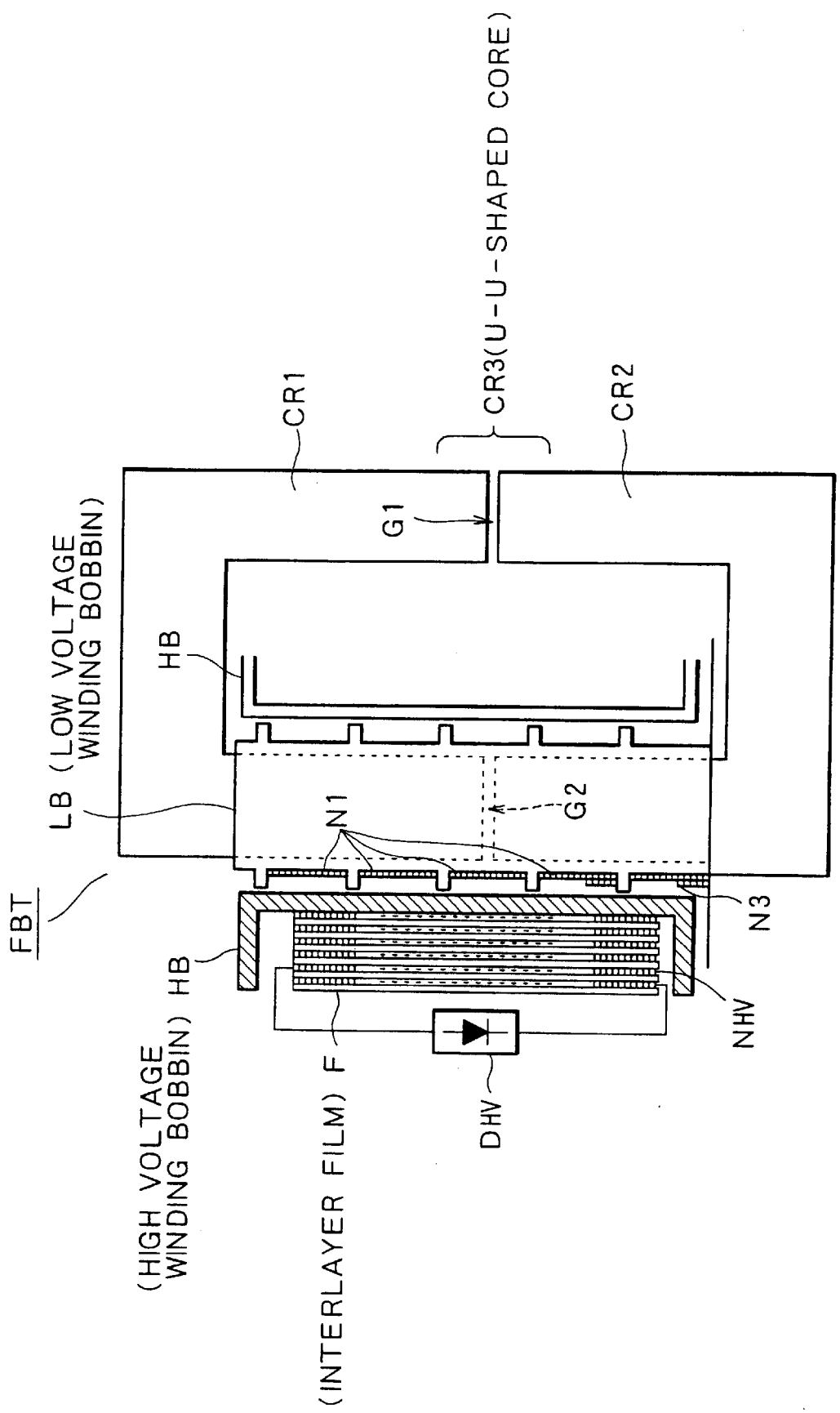
FIG. 4 is a sectional configuration view of a flyback transformer provided in the high voltage stabilizing circuit of the above embodiment, in which step-up windings are wound by a layer winding method.
Figure 5:
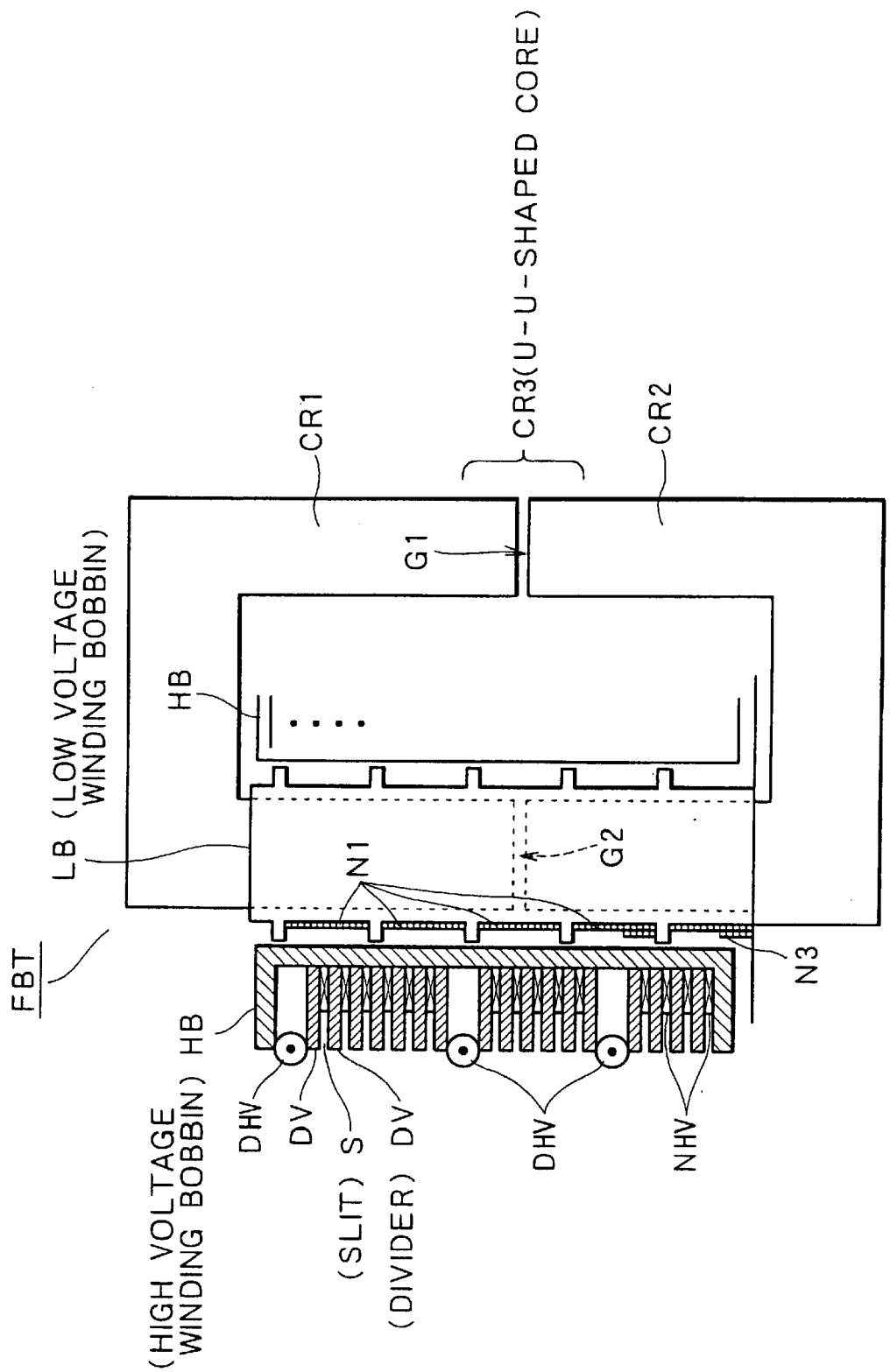
FIG. 5 is a sectional configuration view of a flyback transformer provided in the high voltage stabilizing circuit of the above embodiment, in which step-up windings are wound by a division winding method.

Examples of the structure of the flyback transformer FBT in the present embodiment are shown in section in FIGS. 4 and 5.

In a first example of the flyback transformer FBT shown in FIG. 4, two U-shaped cores CR1 and CR2 are combined in such a manner that magnetic legs of the two U-shaped cores are opposed to each other, thereby forming a U-U-shaped core CR3. Also, gaps G1 and G2 are provided in portions where ends of the magnetic legs of the U-shaped core CR1 are opposed to ends of the magnetic legs of the U-shaped core CR2.

As shown in FIG. 4, a low voltage winding bobbin LB and a high voltage winding bobbin HB are attached to one magnetic leg of the U-U-shaped core CR3. A primary winding N1 and step-up windings NHV (1 to 5) are separately wound around the low voltage winding bobbin LB and the high voltage winding bobbin HB, respectively.

In this case, the primary winding N1 is wound around the low voltage winding bobbin LB, and the step-up windings NHV are wound around the high voltage winding bobbin HB. When the step-up windings NHV (1 to 5) are wound around the high voltage winding bobbin HB, the step-up windings NHV need to be insulated from each other. Therefore, the step-up windings NHV are wound by a method referred to as layer winding, in which an interlayer film F is inserted between every two of the winding layers formed by the step-up windings NHV having given numbers of turns.

In order to insulate the step-up windings NHV (1 to 5) from each other, a so-called division winding (slit winding) structure as shown in FIG. 5 may be adopted in addition to the structure shown in FIG. 4. Incidentally, in FIG. 5, the same parts as in FIG. 4 are identified by the same reference numerals, and their description will be omitted.

When the step-up windings NHV are wound by the division winding method, dividers DV are formed inside a high voltage winding bobbin HB1 integrally therewith, as shown in FIG. 5. Thus, a plurality of slits S, or winding regions, are formed between adjacent dividers DV. Then, the step-up windings NHV are wound in their respective slits S, whereby the step-up windings NHV are insulated from each other.

Incidentally, each of FIGS. 4 and 5 shows a tertiary winding N3 provided in a portion of a divided region of the low voltage winding bobbin LB, because in some cases, for example, provision of low direct-current voltage on the primary side requires the tertiary winding N3 that generates low alternating voltage, that is, a source of the low direct-current voltage.

In the structures of the flyback transformers FBT shown in FIGS. 4 and 5 adopted in the present embodiment, the primary winding N1 on the primary side and the step-up windings NHV (1 to 5) on the secondary side are closely coupled to each other.

Description will hereinafter be made with reference to FIG. 1 again.

As described above, the switching output of the switching device Q1 is transmitted to the primary winding N1 of the flyback transformer FBT. A high voltage generating circuit 40 including the flyback transformer FBT uses alternating voltage of the primary winding N1 generated by the transmitted switching output to ultimately generate and output high direct-current voltage EHV. In the present embodiment and other examples, the high direct-current voltage EHV is used as anode voltage of a CRT.

The circuit configurations of the flyback transformer FBT and the high voltage generating circuit 40 including the flyback transformer FBT according to the present embodiment are similar to those shown earlier in FIG. 6, and therefore their description will be omitted here.

The high voltage generating circuit 40 of the present embodiment supplies the control circuit 1 with a divided voltage output obtained by dividing the high direct-current voltage EHV by a voltage dividing resistance R1–R2. The control circuit 1 changes a detection output level according to the level of the supplied divided voltage of the high direct-current voltage EHV. The detection output is inputted to the oscillating circuit 4 on the primary side via the photocoupler 2. The oscillating circuit 4 changes the frequency of the oscillating signal according to the inputted detection output level, as described above, and then supplies the oscillating signal to the driving circuit 4.

Accordingly, the switching frequency of the switching device Q1 which is driven by driving voltage outputted from the driving circuit 4 is changed, and thus switching output transmitted to the flyback transformer FBT is controlled. As a result, irrespective of variations in a load connected to the high direct-current voltage EHV, for example, primary-side alternating voltage V1 at the primary winding N1 of the flyback transformer FBT is controlled to a constant level. Accordingly, the high direct-current voltage EHV obtained on the secondary side of the flyback transformer FBT is also controlled to a constant level.

Thus, the high voltage stabilizing circuit of the present embodiment stabilizes the high direct-current voltage EHV.

FIGS. 2A to 2D are waveform diagrams showing switching operation of the switching device Q1 in the high voltage stabilizing circuit of FIG. 1.

The switching operation shown in FIGS. 2A to 2D is obtained when the primary winding N1 in the high voltage stabilizing circuit of FIG. 1 has the number of turns, 75T and an inductance L1 of 450 $\mu$H, and each of the step-up windings NHV1 to NHV5 has the number of turns, 500T. The parallel resonant capacitor Cr is set at 5600 pF and the direct current blocking capacitor C11 is set at 1 $\mu$F, while the inductance L2 of the choke coil CH is set at 50 $\mu$H. Load conditions are set so as to provide a high voltage load current IHV=1 mA (at a high voltage load power of 27 W) to 0 mA (at no load power of 0 W) at a high direct-current voltage EHV=27 KV.

FIGS. 2A and 2B show a switching output current IQ1 flowing in the drain of the switching device Q1 and a parallel resonance voltage VQ1 across the parallel resonant capacitor Cr, respectively, at a commercial alternating-current power VAC=90 V and at a high voltage load current IHV=1 mA. FIGS. 2C and 2D show a switching output current IQ1 and a parallel resonance voltage VQ1, respectively, at a commercial alternating-current power VAC=120 V and at a high voltage load current IHV=0 mA.

First, as shown in FIG. 2A, in operation at a commercial alternating-current power VAC=90 V and at a high voltage load current IHV=1 mA (at a load power of 27 W), the switching output current IQ1 is maintained at a zero level for a period TOFF for which the switching device Q1 is turned off, and increases so as to form a saw tooth-shaped line for a period TON for which the switching device Q1 is turned on.

As shown in FIG. 2B, as a result of resonant operation of the primary-side parallel resonant circuit that occurs during the off period of the switching device Q1, the parallel resonance voltage VQ1 forms a sinusoidal pulse waveform during the period TOFF.

When the switching frequency of the switching device Q1 is variably controlled, the period TOFF during which the switching device Q1 is turned off within one switching period of switching operation of the voltage resonance type converter is kept constant, while the period TON during which the switching device Q1 is turned on is variably controlled. The period TOFF is expressed as:

$$TOFF = \pi\sqrt{L1 \cdot Cr} \qquad \text{[Equation 1]}$$

L1: inductance of primary winding N1
Cr: capacitance of parallel resonant capacitor Cr The inductance L1 (=450 µH) of the primary winding N1 and the capacitance (=5600 pF) of the parallel resonant capacitor Cr are set as described above, and therefore according to the above equation 1, the period TOFF remains 5 µs regardless of whether the switching frequency is variably controlled according to load variations. This is also understood from FIGS. 2A and 2B and FIGS. 2C and 2D, in which both of the periods TON are 5 µs.

The level of the parallel resonance voltage VQ1 in the parallel resonant circuit is expressed as:

$$VQ1 = Ei\{1 + \pi/2(TON/TOFF)\} \qquad \text{[Equation 2]}$$

In the present embodiment, at a commercial alternating-current power VAC=90 V and at a high voltage load current IHV=1 mA, the period TON during which the switching device Q1 is turned on is set at 25.5 µs, as shown in FIGS. 2A and 2B. Thus, a resonance pulse of the parallel resonance voltage VQ1 becomes 900 Vp. The parallel resonance voltage VQ1 includes a rectified and smoothed voltage Ei=100 V that is obtained at a high voltage load power of 27 W. Thus, a switching output voltage V1, or an alternating voltage occurring in the primary winding N1, is 800 Vp, a voltage level obtained after the direct current blocking capacitor C11 cuts off the rectified and smoothed voltage Ei=100 V from the parallel resonance voltage VQ1=900 V. The switching frequency fs in this case is controlled so as to ultimately become 33 KHz.

At a commercial alternating-current power VAC=120 V and at a high voltage load current IHV=0 mA (at no load), the switching frequency of the switching device Q1 is controlled to a higher level. Practically, the period TON during which the switching device Q1 is turned on is set to be TON=15 µs, as shown in FIGS. 2C and 2D. The switching frequency fs in this case is fs=50 KHz.

As shown in FIG. 2C, the switching output current IQ1 is maintained at a zero level during the period TOFF, and forms a saw tooth-shaped waveform during the period TON. As shown in FIG. 2D, the parallel resonance voltage VQ1 forms a sinusoidal resonance pulse waveform during the period TOFF. To make sure of the above description, the period TOFF is constant at 5 µs in this case, regardless of change in the switching frequency.

Since the switching frequency is set as described above on an assumption that a rectified and smoothed voltage Ei=170 V is obtained, the resonance pulse of the parallel resonance voltage VQ1 is at a level of 970 Vp. Thus, the switching output voltage V1 across the primary winding N1 is 800 Vp, a voltage level obtained after the direct current blocking capacitor C11 cuts off the rectified and smoothed voltage Ei=170 V from the parallel resonance voltage VQ1=970 V.

Thus, the high voltage stabilizing circuit of the present embodiment shown in FIG. 1 variably controls the switching frequency according to variation in the high direct-current voltage EHV caused by load variation or variation in alternating input voltage, whereby the switching output voltage V1 obtained at the primary winding N1 of the flyback transformer FBT is controlled to a constant level of 800 Vp, for example. Hence, as described above, the high direct-current voltage EHV obtained on the secondary side of the flyback transformer FBT is also controlled to a constant level of 27 KV, for example.

A comparison of the high voltage stabilizing circuit shown earlier in FIG. 6 as a conventional circuit with the circuit of the present embodiment shown in FIG. 1 indicates the following.

The circuit shown in FIG. 6 allows the switching frequency of the switching converter for power conversion on the primary side to be in synch with the horizontal synchronizing signal frequency fH. Therefore, in order to stabilize the high direct-current voltage EHV, it is necessary to variably control an on period within one switching cycle (PWM control) under a condition where the switching frequency is fixed to the horizontal synchronizing signal frequency. Thus, two switching converters, that is, the step-down converter 20 and the voltage resonance type converter 30 need to be provided on the primary side for power conversion.

On the other hand, the switching frequency of the voltage resonance type converter provided on the primary side of the high voltage stabilizing circuit of FIG. 1 is independent of the horizontal synchronizing signal frequency fH and hence not in synchronism therewith. Thus, it is possible to stabilize the high direct-current voltage EHV by variably controlling the switching frequency as described above. This means that it is possible to stabilize the high direct-current voltage EHV by providing only one voltage resonance type converter on the primary side of the high voltage stabilizing circuit of the present embodiment.

Thus, power conversion efficiency in the circuit shown in FIG. 1 is greatly improved. In actuality, at a high voltage load power PHV=27 W, for example, power conversion efficiency in the circuit shown in FIG. 6 is 72%, while that in the circuit shown in FIG. 1 is improved to as high as 86%.

In addition, the alternating-current input power of the circuit in FIG. 1 is reduced. At a high voltage load power PHV=27 W, for example, the alternating-current input power of the circuit in FIG. 6 is 37.5 W, while that of the circuit in FIG. 1 is reduced to about 31.4 w.

Moreover, as described above, the circuit shown in FIG. 1 is provided with only one voltage resonance type converter on the primary side, and therefore the number of parts for forming the circuit is reduced, thereby making it possible to reduce size of the circuit board and cost of the circuit.

Figure 9:
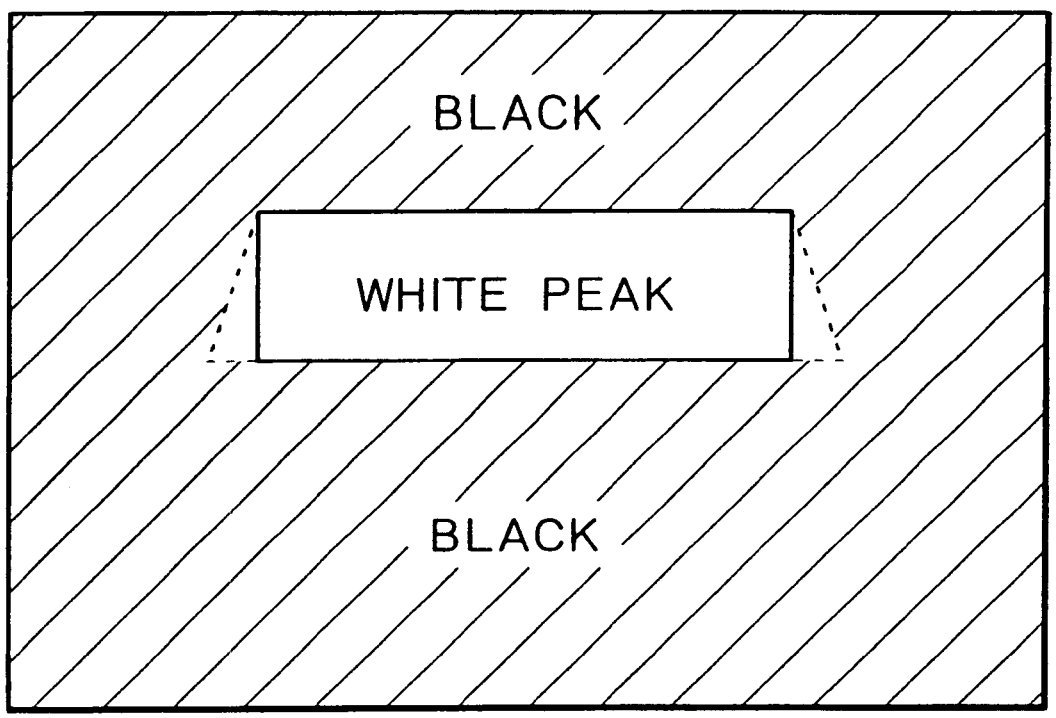
FIG. 9 is a diagram of assistance in explaining how a white peak image displayed on a CRT is distorted.

Furthermore, the circuit shown in FIG. 1 makes it possible to readily reduce the distortion of a white peak image described with reference to FIG. 9 by effecting power supply at a maximum load power in a state in which the switching frequency is decreased to the lower limit of its control range, for example, in displaying a white peak image. Thus, it is not necessary to increase capacitance of the capacitors in the circuit, which also makes it possible to reduce the size and cost of the circuit.

Figure 3:
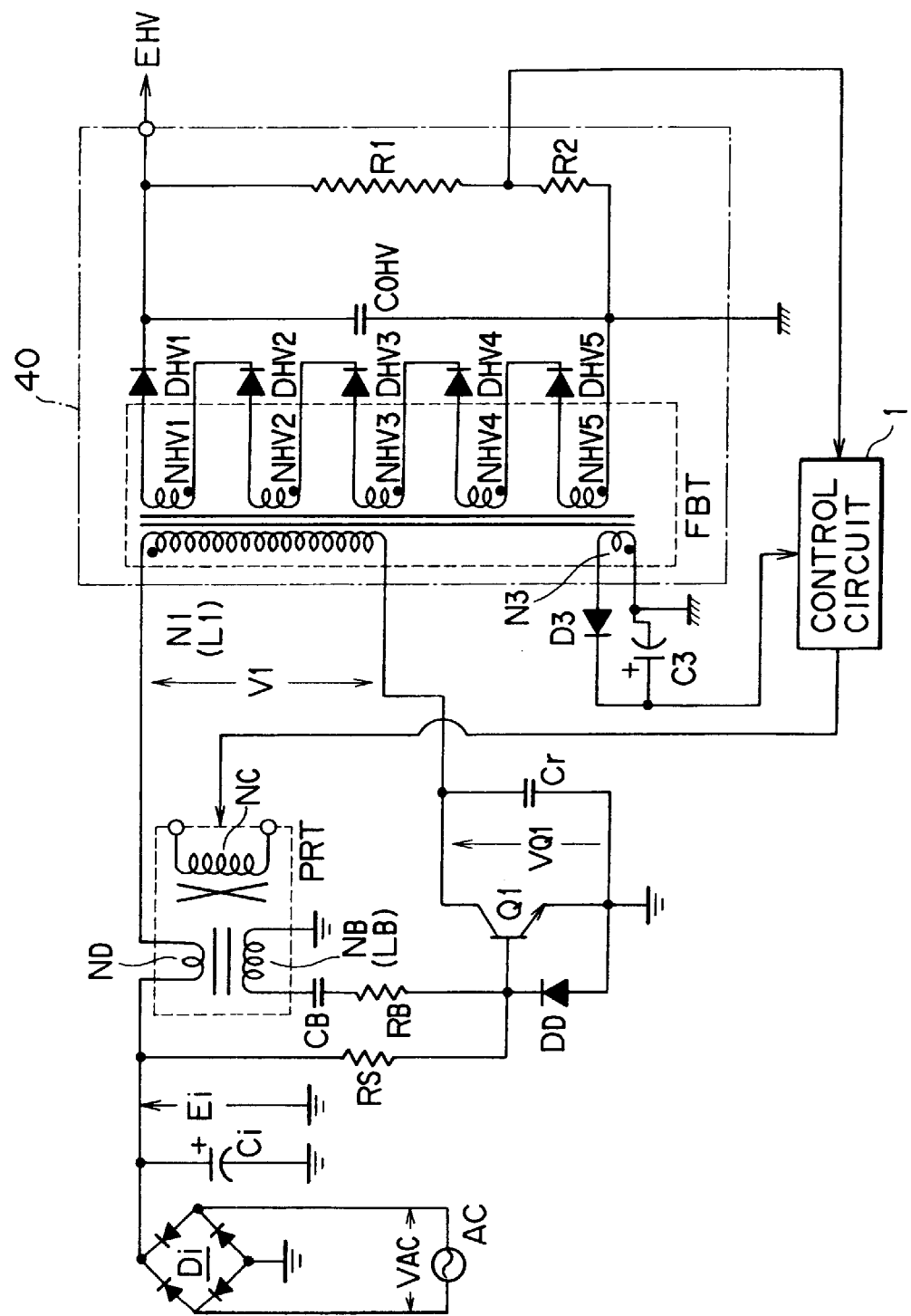
FIG. 3 is a circuit configuration diagram of a high voltage stabilizing circuit according to another embodiment of the present invention.

Another example of a high voltage stabilizing circuit according to another embodiment of the present invention will next be described with reference to a circuit diagram of FIG. 3. In FIG. 3, the same parts as in FIG. 1 are identified by the same reference numerals, and their description will be omitted.

The high voltage stabilizing circuit shown in FIG. 3 is provided with a self-excited voltage resonance type converter on the primary side of a flyback transformer FBT. The present embodiment also includes one switching device Q1, which performs switching operation by the single-ended system. In this case, a high voltage bipolar transistor (BJT; junction transistor) is used as the switching device Q1.

Also in this case, a rectifying and smoothing circuit formed by a bridge rectifier circuit Di and a smoothing capacitor Ci is provided. The rectifying and smoothing circuit generates rectified and smoothed voltage whose level substantially corresponds to an alternating-current input voltage VAC multiplied by unity, and supplies the voltage resonance type converter with the rectified and smoothed voltage as direct-current input voltage.

A base of the switching device Q1 is connected to a positive electrode side of the smoothing capacitor Ci (rectified and smoothed voltage Ei) via a starting resistance RS, so that base current at the start of power supply is taken from a line of the rectifying and smoothing circuit. Connected between the base of the switching device Q1 and a primary-side ground is a series resonant circuit for self-oscillation driving that is formed by connecting a driving winding NB, a resonant capacitor CB, and a base current limiting resistance RB in series with each other.

A clamp diode DD inserted between the base of the switching device Q1 and a negative electrode of the smoothing capacitor Ci (primary-side ground) forms a path of clamp current that flows during the off period of the switching device Q1. A collector of the switching device Q1 is connected to one end of a primary winding N1 of the flyback transformer FBT, while an emitter of the switching device Q1 is grounded. Thus, switching output of the switching device Q1 is transmitted to the primary winding N1 of the flyback transformer FBT.

In this case, a parallel resonant capacitor Cr is connected in parallel with the collector and emitter of the switching device Q1. Capacitance of the parallel resonant capacitor Cr and leakage inductance L1 of the primary winding N1 side of the flyback transformer FBT form a primary-side parallel resonant circuit of the voltage resonance type converter. Also in the self-excited voltage resonance type converter, voltage V1 across the resonant capacitor Cr forms a resonance pulse during the off period of the switching device Q1, whereby voltage resonance type operation is obtained.

An orthogonal type control transformer PRT is a saturable reactor provided with a resonance current detecting winding ND, the driving winding NB, and a control winding NC. The orthogonal type control transformer PRT is provided to drive the switching device Q1 and effect control for constant voltage.

The structure of the orthogonal type control transformer PRT, not shown in the figure, is a cubic core formed by connecting two double U-shaped cores each having four magnetic legs with each other at ends of the magnetic legs. The resonance current detecting winding ND and the driving winding NB are wound around two given magnetic legs of the cubic core in the same winding direction, and the control winding NC is wound in a direction orthogonal to the resonance current detecting winding ND and the driving winding NB.

In this case, the resonance current detecting winding ND of the orthogonal type control transformer PRT is inserted in series between the positive electrode of the smoothing capacitor Ci and the primary winding N1 of the flyback transformer FBT, so that the switching output of the switching device Q1 is transmitted to the resonance current detecting winding ND via the primary winding N1. The switching output obtained by the resonance current detecting winding ND of the orthogonal type control transformer PRT is induced in the driving winding NB via transformer coupling, whereby an alternating voltage is generated as driving voltage in the driving winding NB. The driving voltage is outputted as driving current to the base of the switching device Q1 from the series resonant circuit (NB and CB), which forms a self-oscillation driving circuit, via the base current limiting resistance RB. Thus, the switching device Q1 performs switching operation at a switching frequency determined by the resonance frequency of the series resonant circuit (NB and CB).

The structure and operation of the flyback transformer FBT and a high voltage generating circuit 40 shown in FIG. 3 are the same as described with reference to FIG. 1, and therefore their description will be omitted here. However, also in this case, alternating voltage generated in the primary winding N1 of the flyback transformer FBT by the transmitted switching output of the switching device Q1 is used to ultimately generate and output high direct-current voltage EHV.

Also in the high voltage stabilizing circuit shown in FIG. 3, a voltage level obtained by dividing the high direct-current voltage EHV by a voltage dividing resistance R1–R2 is inputted as a detection voltage to a control circuit 1, whereby the control circuit 1 detects variation in the level of the high direct-current voltage EHV.

In this case, a tertiary winding N3 is provided on the primary side of the flyback transformer FBT, and a half-wave rectifier circuit comprising a diode D3 and a capacitor C3 is connected to the tertiary winding N3, so that low direct-current voltage is generated. The half-wave rectifier circuit is configured so as to supply the control circuit 1 with the low direct-current voltage as operating power.

The control circuit 1 in this case operates to change the level of control current (direct current) flowing through the control winding NC according to change in the high direct-current voltage EHV. Then, inductance LB of the driving winding NB provided in the orthogonal type control transformer PRT is variably controlled by the control current. This changes resonance conditions of the series resonant circuit including the inductance LB of the driving winding NB within the circuit for self-oscillation driving of the switching device Q1. Accordingly, the operation of the control circuit 1 changes the switching frequency of the switching device Q1.

As in the case of the circuit shown in FIG. 1, components in the circuit are selected so that the switching frequency fs is variably controlled in a required control range (for example fs=33 KHz to 50 KHz) according to variation in the high direct-current voltage EHV and thereby switching output voltage V1 obtained at the primary winding N1 of the flyback transformer FBT becomes constant. Thus, the high direct-current voltage EHV is stabilized. A circuit configuration such as to achieve the same operation as described with reference to the waveform diagram of FIGS. 2A to 2D, for example, suffices for actual switching frequency control in this case.

The circuit configuration of FIG. 3 described so far can be considered to be the circuit configuration of FIG. 1 in which the choke coil CH and the direct current blocking capacitor C11 are removed and the voltage resonance type converter is externally excited. Such a configuration of the high voltage stabilizing circuit as shown in FIG. 3 can be applied in cases where load conditions of the high direct-current voltage EHV do not include high load peak power, for example. As described above, the high voltage stabilizing circuit may be configured with a simple self-oscillation circuit and without the choke coil CH, the direct current blocking capacitor C11 or the like, for example, and therefore it is possible to further reduce size and cost of the high voltage stabilizing circuit.

In the present embodiment, the orthogonal type control transformer is used to effect control for constant voltage in a circuit configuration provided with the self-excited resonance converter on the primary side; however, an oblique type control transformer proposed by the present applicant prior to the present invention may be employed instead of the orthogonal type control transformer.

As in the case of the orthogonal type control transformer, the structure of the oblique type control transformer, which is not shown in the figure, is a cubic core formed by combining two double U-shaped cores each having four magnetic legs with each other, for example. A control winding NC and a driving winding NB are wound around the cubic core in obliquely crossing winding relation to each other. Specifically, either the control winding NC or the driving winding NB is wound around two adjacent magnetic legs of the four magnetic legs of the cubic core, and the other winding is wound around the two other magnetic legs situated in diagonal positional relation to the above two magnetic legs.

The oblique type control transformer operates in such a manner that inductance of the driving winding is increased even when alternating current flowing through the driving winding is changed from a negative current level to a positive current level. Thus, the level of current in a negative direction for turning off the switching device is increased, and thereby storage time of the switching device is shortened. As a result of this, fall time of the switching device at turn-off is also shortened, thereby enabling further reduction of power loss in the switching device.

In the circuit of the present embodiment, a self-excited or externally excited voltage resonance type converter employing a single-ended system is described as an example of a switching converter to be provided on the primary side; for example, however, a self-excited or externally excited voltage resonance type converter employing a push-pull system that is provided with two switching devices may be used.

The high voltage stabilizing circuit of the present embodiment has been described on an assumption that it is applied to a display unit for a personal computer; however, the high voltage stabilizing circuit of the present embodiment can be applied to, for example, television receivers and various other display units having CRTs as display devices.

As described above, the high voltage stabilizing circuit according to the present invention has a voltage resonance type converter as a switching converter that performs switching operation using direct-current input voltage obtained from commercial alternating-current power, and switching output of the voltage resonance type converter is directly transmitted to a primary winding of a flyback transformer FBT (high voltage output transformer) Then, a rectifier circuit for high voltage connected on the secondary side of the flyback transformer FBT provides high direct-current voltage as an anode voltage for a CRT, for example.

The high direct-current voltage is stabilized by controlling the switching frequency of the voltage resonance type converter on the primary side according to the level of the high direct-current voltage. In this case, the voltage resonance type converter on the primary side has a free running switching frequency independent of a horizontal synchronizing signal frequency, for example.

Such a configuration requires only one switching converter to be provided on the primary side of the high voltage stabilizing circuit. Thus, overall power conversion efficiency in the high voltage stabilizing circuit is greatly improved, and also alternating-current input power is reduced.

In addition, since the high voltage stabilizing circuit is provided with only one switching converter on the primary side, the number of parts for forming the circuit is greatly reduced, thereby making it possible to reduce size of the circuit board and cost of the circuit.

Moreover, the circuit configuration according to the present invention makes it possible to readily and effectively reduce distortion of a white peak image by lowering the switching frequency to a required level and by increasing power supplied to a load to a required level. Thus, it is not necessary to increase capacitance of the capacitors in the circuit, which also makes it possible to reduce the size and cost of the circuit.

While a preferred embodiment of the present invention has been described using specific terms, such description is for illustrative purposes only, and it is to be understood that changes and variations may be made without departing from the spirit or scope of the following claims.

What is claimed is:

1. A high voltage stabilizing circuit comprising:

rectifying and smoothing means for rectifying and smoothing commercial alternating-current power and thereby providing direct-current input voltage;

switching means having a switching device for interrupting said direct-current input voltage for output;

a parallel resonant circuit on a primary side formed so as to convert operation of said switching means into voltage resonance type operation;

a high voltage output transformer having a primary-side winding to which switching output of said switching means is transmitted and a secondary-side winding closely coupled to the primary winding for inducing a required high level of stepped-up alternating voltage;

high direct-current voltage generating means supplied with said stepped-up alternating voltage for generating and outputting a required high level of direct-current voltage; and constant voltage control means for controlling said high direct-current voltage to a constant voltage by changing switching frequency of said switching device according to level of said high direct-current voltage.

2. A high voltage stabilizing circuit as claimed in claim 1, wherein:

said parallel resonant circuit is formed by a choke coil inserted between a positive terminal of a smoothing capacitor forming said rectifying and smoothing means and a switching output point of the switching device, and a parallel resonant capacitor and a diode device connected in parallel with said switching device; and a series connection circuit of said primary-side winding and a direct current blocking capacitor is connected to said switching device.

3. A high voltage stabilizing circuit as claimed in claim 1, wherein:

said parallel resonant circuit is formed by said primary-side winding inserted between a positive terminal of a smoothing capacitor forming said rectifying and smoothing means and a switching output point of the switching device, and a parallel resonant capacitor connected in parallel with said switching device.

* * * * *